United States Patent [19]
Rune

[11] Patent Number: 5,517,674
[45] Date of Patent: May 14, 1996

[54] LOW CAPACITY MOBILE ASSISTED HANDOFF IN A CELLULAR COMMUNICATIONS NETWORK

[75] Inventor: Gören Rune, Linköping, Sweden

[73] Assignee: Telefonaktiebolaget LM Ericsson, Stockholm, Sweden

[21] Appl. No.: 103,135

[22] Filed: Aug. 9, 1993

[51] Int. Cl.[6] .................................................... H04Q 7/00
[52] U.S. Cl. .................... 455/33.2; 455/33.1; 455/54.1; 455/56.1; 379/60
[58] Field of Search ................................ 455/33.1, 33.2, 455/33.4, 54.1, 56.1, 54.2, 69, 34.1, 53.1; 379/59, 60, 58

[56] References Cited

U.S. PATENT DOCUMENTS

| | | | |
|---|---|---|---|
| 4,398,063 | 8/1983 | Hass et al. ............................ | 179/2 EB |
| 4,435,840 | 3/1984 | Kojima et al. ......................... | 455/33 |
| 4,670,899 | 6/1987 | Brody et al. .......................... | 379/60 |
| 4,670,905 | 6/1987 | Sandvos et al. ....................... | 455/33 |
| 4,718,081 | 1/1988 | Brenig ................................... | 379/60 |
| 4,726,050 | 2/1988 | Menich et al. ......................... | 379/60 |
| 4,737,978 | 4/1988 | Burke et al. ........................... | 379/60 |
| 4,765,753 | 8/1988 | Schmidt ................................ | 379/60 |
| 4,783,780 | 11/1988 | Alexis ................................... | 370/95 |
| 4,811,380 | 3/1989 | Spear .................................... | 379/60 |
| 4,829,519 | 5/1989 | Scotton et al. ........................ | 371/5 |
| 4,887,265 | 12/1989 | Felix ..................................... | 370/94.1 |
| 4,955,082 | 9/1990 | Hattori et al. ......................... | 455/33 |
| 5,040,238 | 8/1991 | Comroe et al. ........................ | 455/33 |
| 5,042,082 | 8/1991 | Dahlin ................................... | 455/33 |
| 5,058,201 | 10/1991 | Ishii et al. ............................. | 455/33 |
| 5,175,867 | 12/1992 | Wejke et al. .......................... | 455/33.1 |
| 5,179,559 | 1/1993 | Cirler et al. .......................... | 370/95.1 |
| 5,278,991 | 1/1994 | Ramsdale et al. .................... | 455/33.2 |

FOREIGN PATENT DOCUMENTS

| | | |
|---|---|---|
| 324509 | 7/1989 | European Pat. Off. . |
| 472511 | 2/1992 | European Pat. Off. . |

OTHER PUBLICATIONS

"Digital Cellular Telecommunication System, RCR Standard", Research & Development Center for Radio Systems (RCR), Version Jan., 1992, Japanese RCR STD–27A, Chapter 4.3, §§ 5.2.11 –5.2.18, §§ 8.6.1–8.6.7, and Appendix C.
"Digital Cellular Telecommunication System, RCR Standard", Research & Development Center for Radio Systems (RCR), Version Dec., 1992, Japanese RCR STD–27B, Chapter 4.3, §§ 5.1.1–5.4.2, §§ 8.6.1–8.6.6, and Appendix C.

Primary Examiner—Reinhard J. Eisenzopf
Assistant Examiner—Lee Nguyen
Attorney, Agent, or Firm—Burns, doane, Swecker & Mathis

[57] ABSTRACT

A method of controlling handoff in a telecommunications network is provided, the network including a land system and a plurality of mobile stations, the land system including a plurality of cells, the method comprising the steps of dividing each cell into a first region where evaluation of measurement values is performed and a second region where the evaluation of measurement values is not performed, performing an evaluation of measurement values when a mobile station enters the first region, and controlling the handoff based on the evaluation of measurement values.

50 Claims, 8 Drawing Sheets

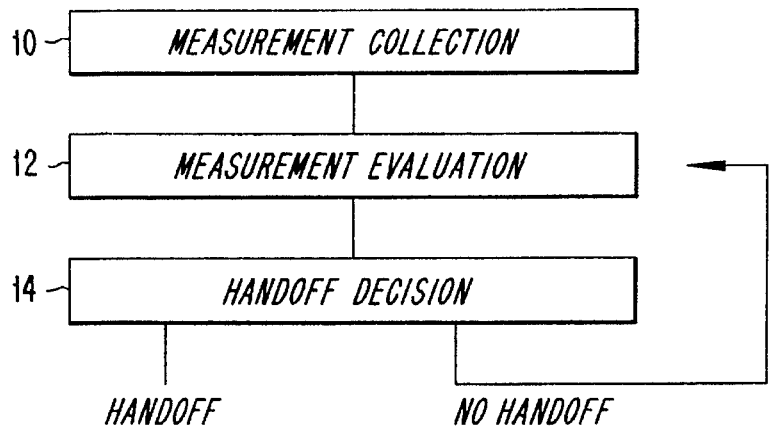
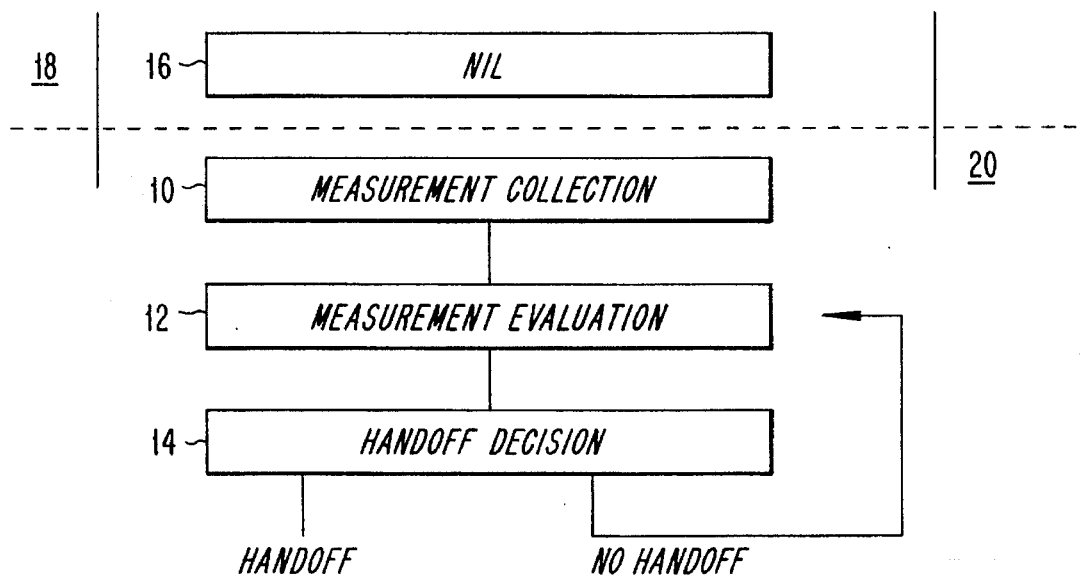

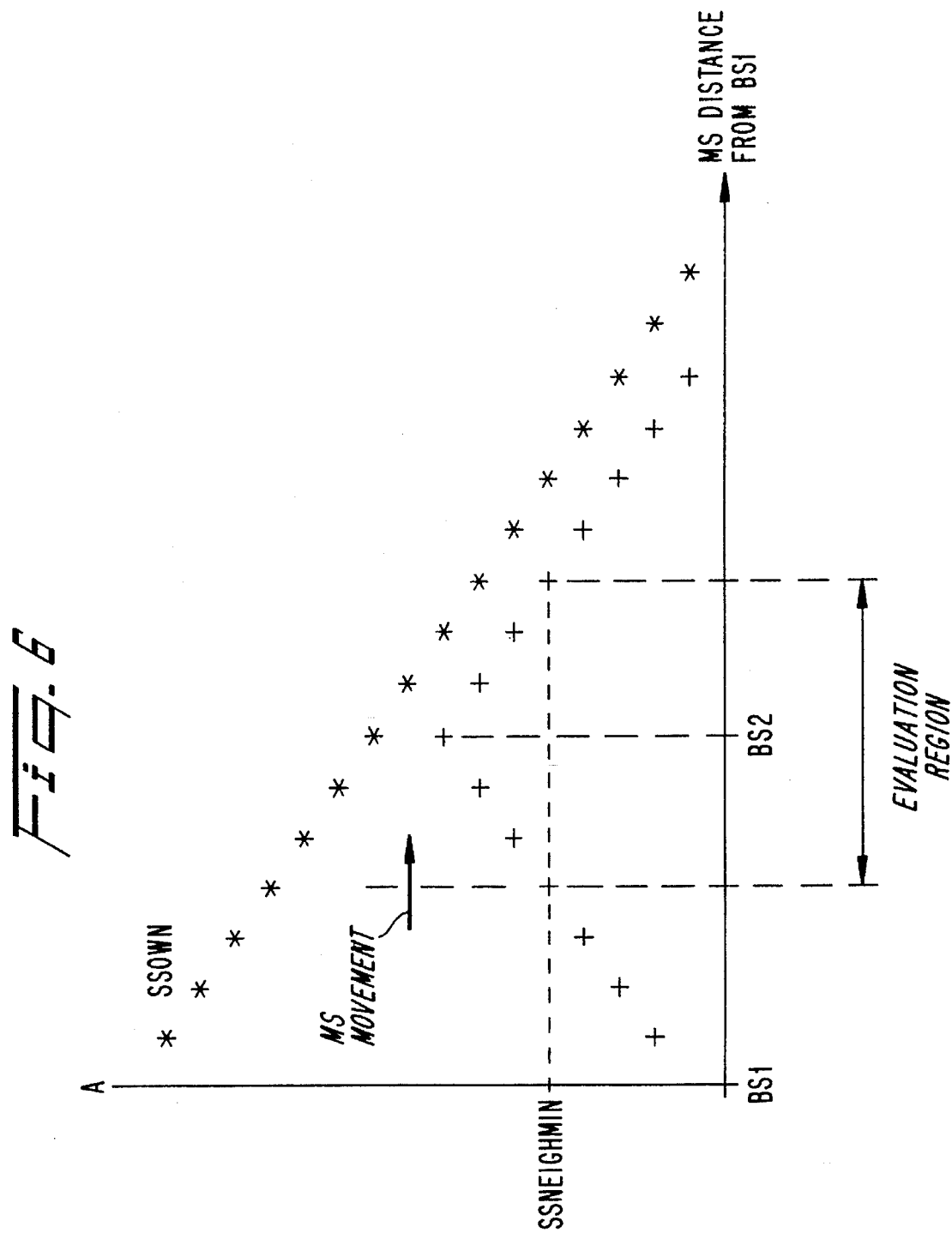

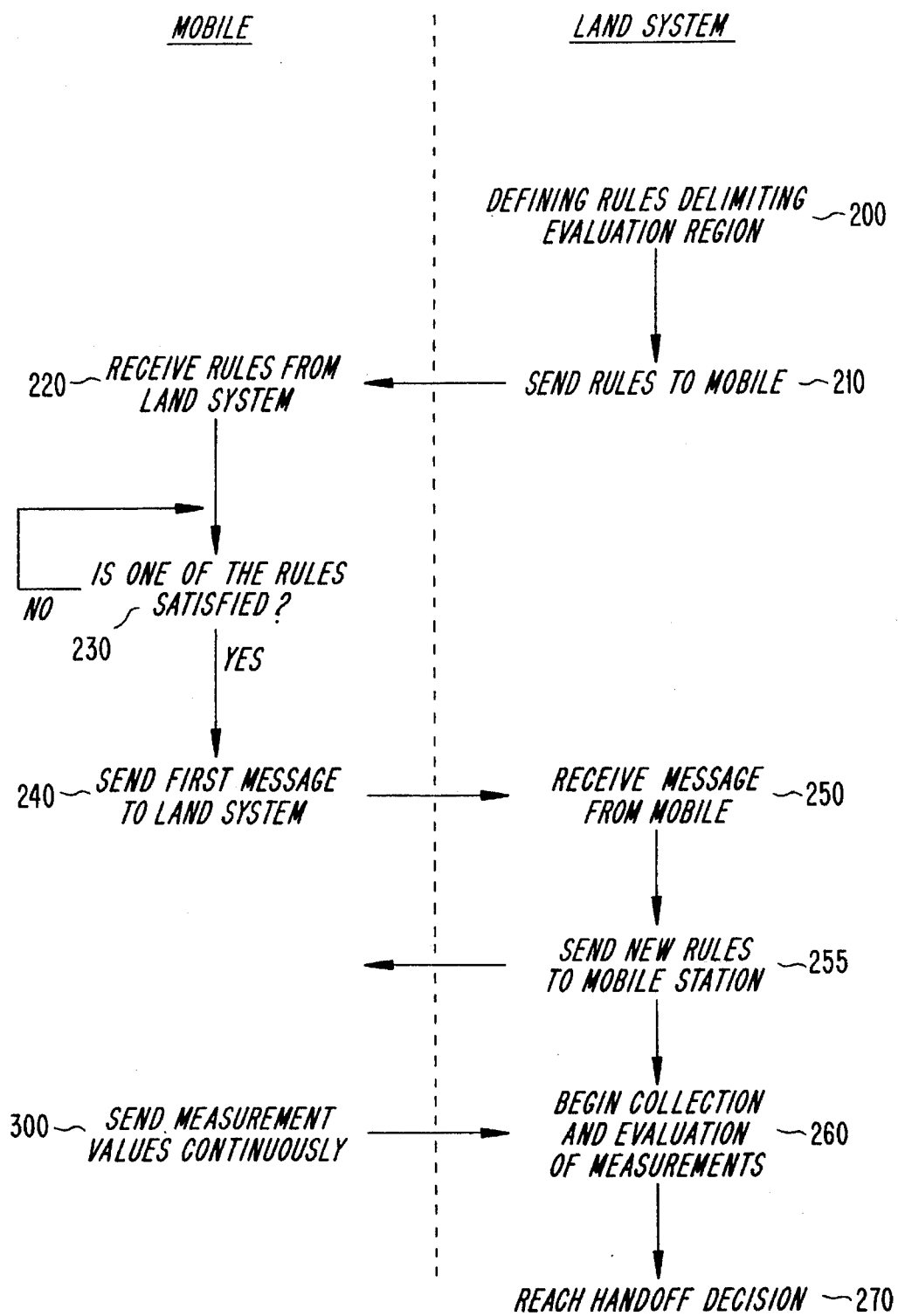

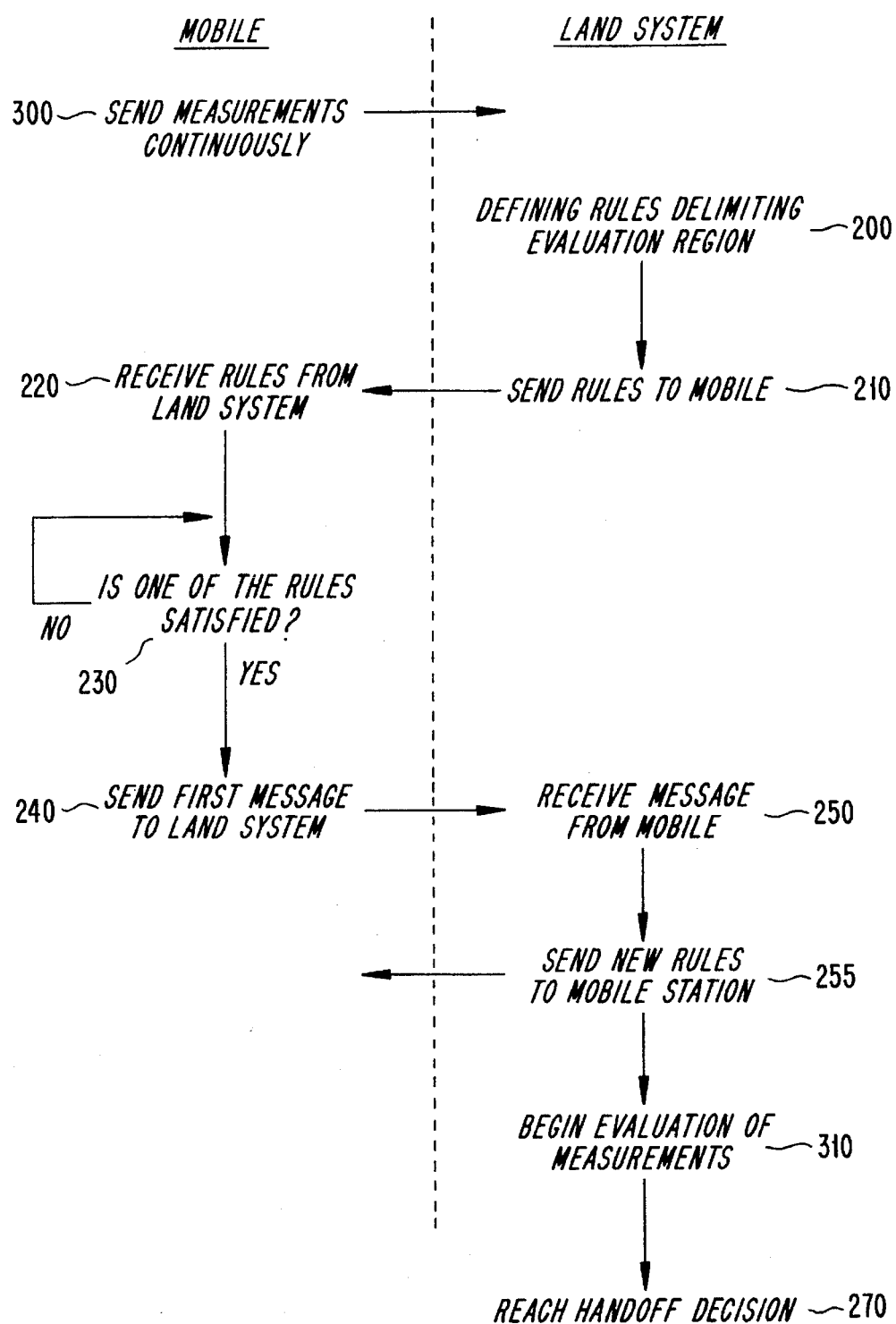

1

LOW CAPACITY MOBILE ASSISTED HANDOFF IN A CELLULAR COMMUNICATIONS NETWORK

BACKGROUND OF THE INVENTION

The present invention is directed to a method and apparatus for controlling traffic in a cellular telecommunications network, and more particularly, for controlling low capacity mobile assisted handoff in a cellular telecommunications network.

Conventional cellular mobile radio telephone systems include a land system and many mobile stations. The land system consists of at least one mobile switching center and several radio base stations which are distributed over a geographical area. Each radio base station serves a cell, i.e., a part of the geographical area, by sending and receiving information to and from mobile stations over radio channels. The mobile switching center, connected on one side to the public switching telephone network and on the other to the base stations, performs most of the control functions required for calls to and from the mobile stations in the geographical area. Because the cells are relatively small, mobile stations often travel between a number of different cells. The process of switching the established call from a home base station in one cell to a target base station in another cell is known as handoff.

In existing analog Frequency Division Multiple Access (FDMA) cellular systems, a base station determines the need for a handoff of mobile stations it is handling based on periodic measurements of the signal strength and signal quality of the uplink (mobile station to base station) voice channel signals received from each mobile station engaged in a call. If the measured signal strength or signal quality is below a predetermined level, that home base station sends a handoff request to the mobile switching center. The mobile switching center queries neighboring base stations for reports of the previously measured signal strength of signals on the voice channel currently being used by the mobile station. A neighboring base station is defined as any base station in the geographical vicinity of the serving base station that detects or can detect the signal strength of communications between the serving base station and one or more mobile stations served by the serving base station. The mobile switching center selects the neighbor base station reporting the strongest signal, provided that signal is above a threshold, and transmits appropriate commands to that target base station and to the mobile station via the home base station to tune to a specified new voice channel. One example of a neighbor-assisted handoff procedure is disclosed in U.S. Pat. No. 5,175,867, commonly-assigned with the present invention.

In dual-mode systems, as specified in the EIA/TIA IS-54 standard, handoff may also be implemented using Mobile-Assisted Handoff (MAHO). Using this procedure, a mobile station may be ordered by the land system to measure and report signal strength and other parameters of the digital radio channel emitted by the home base station, and the neighbor base stations. This enables handoff requests by a home base station to be based not only on the signal strength and other parameters of the uplink signal received from the mobile station, but also on the down link signal parameters detected by the mobile station of the home and neighbor base stations. However, when performing a handoff from an analog to a digital channel, MAHO cannot be used because the mobile station cannot report signal strength or other signal parameter measurements over an analog channel.

In purely digital cellular systems, mobile-assisted handoff may always be used. For a more detailed description of mobile-assisted handoff, reference is made to U.S. Pat. No. 5,042,082.

One of the disadvantages that results when these handoff methods are used is that a large amount of network resources are consumed during the handoff process. In particular, in digital networks, the mobile station continually reports to the land system signal strength measurement values for its own current connection as well as signal strength measurement values of the messages the mobile station receives on the broadcast channel of the neighboring cells. The measurements from the mobile station together with signal strength measurements from the base station are the basis for the evaluation of the measurements by the land system.

This handoff process is illustrated in FIG. 1, from the network or land system side. In particular, the network performs the measurement collection (10) from the mobile stations and from the base stations in the network. The network then performs the measurement evaluation (12) to determine whether or not handoff should occur (14) and which base station should be selected to receive the handoff. This evaluation process utilizes a large part of the resources used in the handoff process. In particular, due to the large amount of data required to be processed, system processors are tied up with such evaluations and therefore are unavailable for other functions.

SUMMARY OF THE INVENTION

It is therefore an object of the present invention to provide a method and apparatus for controlling mobile assisted handoff which does not suffer from the disadvantages noted above.

It is an object of the present invention to provide a method of controlling handoff which combines the reduction of processing capacity utilization and the maintenance of the network characteristics related to handoff in control of the network.

According to one embodiment of the present invention, a method of controlling handoff in a telecommunications network is provided, the network including a land system and a plurality of mobile stations, the land system including a plurality of cells, the method including the steps of dividing each cell into a first region where evaluation of measurement values is performed and a second region where the evaluation of measurement values is not performed, performing an evaluation of measurement values when a mobile station enters the first region, and controlling the handoff based on the evaluation of measurement values.

According to one embodiment of the present invention, a method of controlling handoff in a cellular network is provided, the network including a land system and a plurality of mobile stations, the land system including at least one base station, the method including defining a plurality of rules in the land system and sending the plurality of rules to the plurality of mobile stations, determining, in a mobile station, if at least one of the rules is satisfied, sending a first message from the mobile station to the land system responsive to at least one of the rules being satisfied, and performing evaluation of measurement values by the land system responsive to receiving the first message.

According to one embodiment, a cellular mobile radio telephone system includes a land system and a plurality of mobile stations, the land system including a plurality of base stations covering corresponding geographical areas in the system. The system comprises means for monitoring signal connection parameters between the mobile stations and the land system, means for dividing the area covered by each base station into an evaluation region and a non-evaluation region, means for performing evaluation of signal connection parameters when a mobile station enters the evaluation region, and means for controlling handoff of a call handled by one of the base stations for a neighboring base station based on the evaluation of the signal connection parameters.

According to one embodiment of the present invention, a cellular mobile radio telephone system comprises a plurality of base stations assigned to cover corresponding geographical areas in the cellular system, a plurality of mobile stations including means for monitoring signal connection parameters between the mobile stations and the base stations, and a mobile switching center for coordinating communications between the plurality of mobile stations and the plurality of base stations. The mobile switching center includes means for dividing the area covered by each base station into a first region where evaluation of the signal connection parameters is performed and a second region where the evaluation of signal connection parameters is not performed, means for performing the evaluation of signal connection parameters when a mobile station enters the first region, and means for controlling handoff of a call handled by one of the base stations for a neighboring base station based on the evaluation of the signal connection parameters.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 1 illustrates the handoff process from the side of the cellular communications network according to the prior art;

FIG. 6 is an illustration showing the detection of a mobile station approaching a small cell lying within an umbrella cell;

FIG. 7 illustrates the handoff process from the side of the cellular communications network according to one embodiment of the present invention;

FIG. 12 is a flow chart illustrating a method of controlling handoff in a cellular telecommunications network according to one embodiment of the present invention; and FIG. 13 is a flow chart illustrating a method of controlling handoff in a cellular telecommunications network according to one embodiment of the present invention.

DETAILED DESCRIPTION OF THE PREFERRED EMBODIMENTS

Before describing the details of the present invention, an example of the construction of a cellular mobile radio system in which the present invention can be used will be described. While the construction show depicts a digital system, it is possible to implement the present invention on either analog or dual-mode systems. The modifications required are within the skill of an ordinarily skilled artisan.

Figure 2:
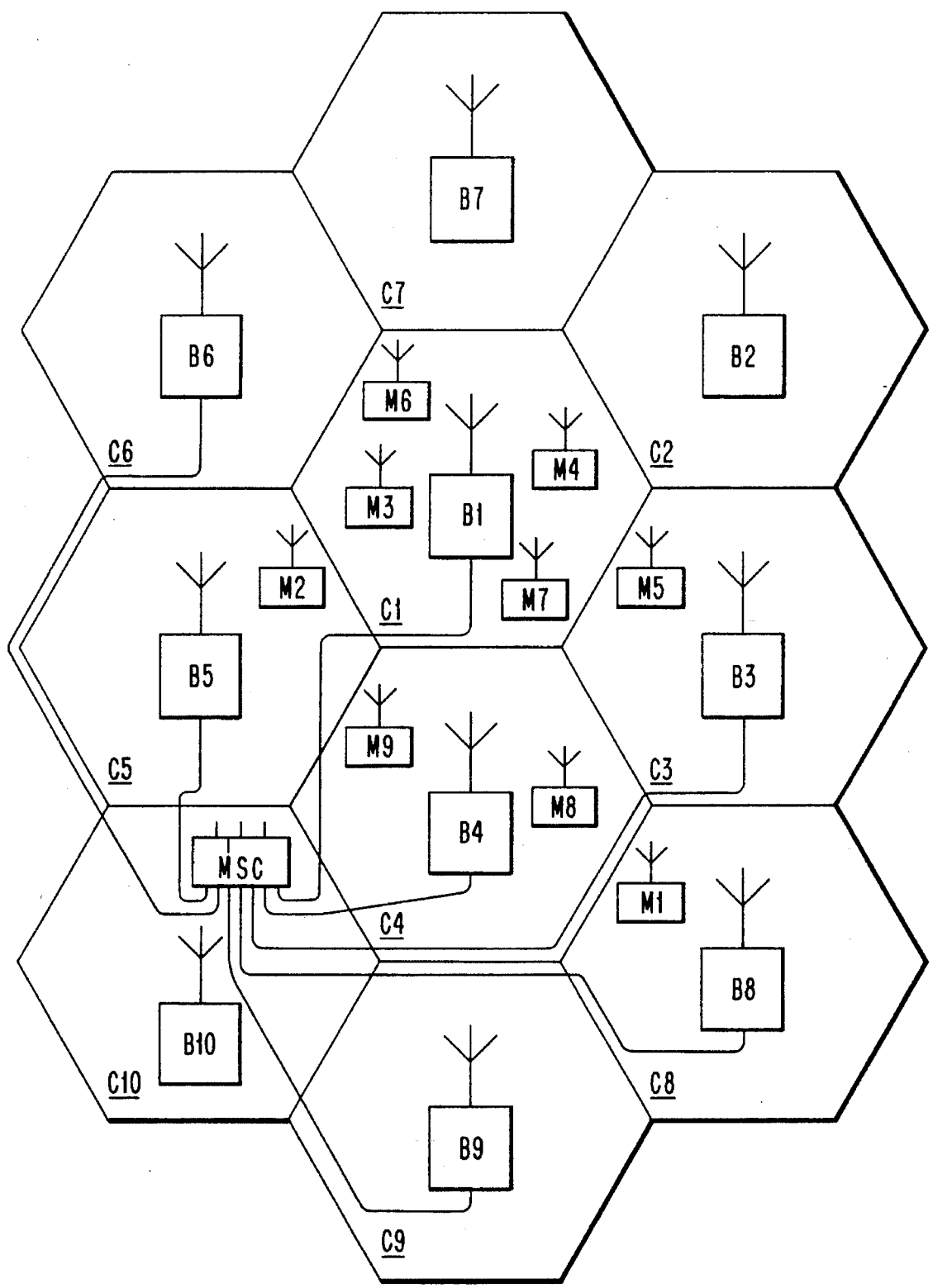
FIG. 2 is a schematic diagram illustrating an example of a cellular mobile radio system, illustrating the relationship of the system's cells, a mobile switching center, base stations and mobile stations.

FIG. 2 is a schematic diagram illustrating ten cells, C1 to C10, in a cellular mobile radio telephone system. Normally the method according to the present invention would be implemented in a cellular mobile radio system comprising many more cells than ten. For purposes of this discussion, the system depicted herein is considered to be an isolated portion of a larger system which has been fragmented.

For each cell C1 to C10, there is a respective base station B1 to B10. FIG. 2 illustrates base stations situated in the vicinity of cell centers and having omni-directional antennas. The base stations of adjacent cells may however be collocated in the vicinity of cell borders and have directional antennas.

FIG. 2 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 2 is a mobile switching center. For simplicity of description, only one such mobile switching center is shown; however, the network may include more than one such center. The network may also include base station controllers connected between the mobile switching centers and the base stations.

The mobile switching center MSC illustrated in FIG. 2 is connected to all ten illustrated base stations by, for instance, cables or other physical connectors. The mobile switching center is also connected by, for instance, cables to a fixed public switching telephone network or similar fixed network with ISDN facilities. All connections from the mobile switching center to base stations and connections to the fixed network are not illustrated. Further, other media may be used instead of cables for base to mobile switching center communications, e.g., fixed radio links.

The cellular mobile radio system illustrated in FIG. 2 includes a plurality of radio channels for communication. The system is designed both for analog information, e.g., speech, digitized analog information, e.g., digitized speech, and pure digital information, e.g., pure digital data. Thus a connection may be a call where two people talk to each other, but may also be a data communication channel where computers exchange data.

Each cellular system is assigned a particular frequency band (wire line or non-wire line). In a traditional cellular system (i.e., one using fixed channel allocation) a set of communication channels is allocated to each cell. For example, between 10 and 30 different voice channels and 1 control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 3:
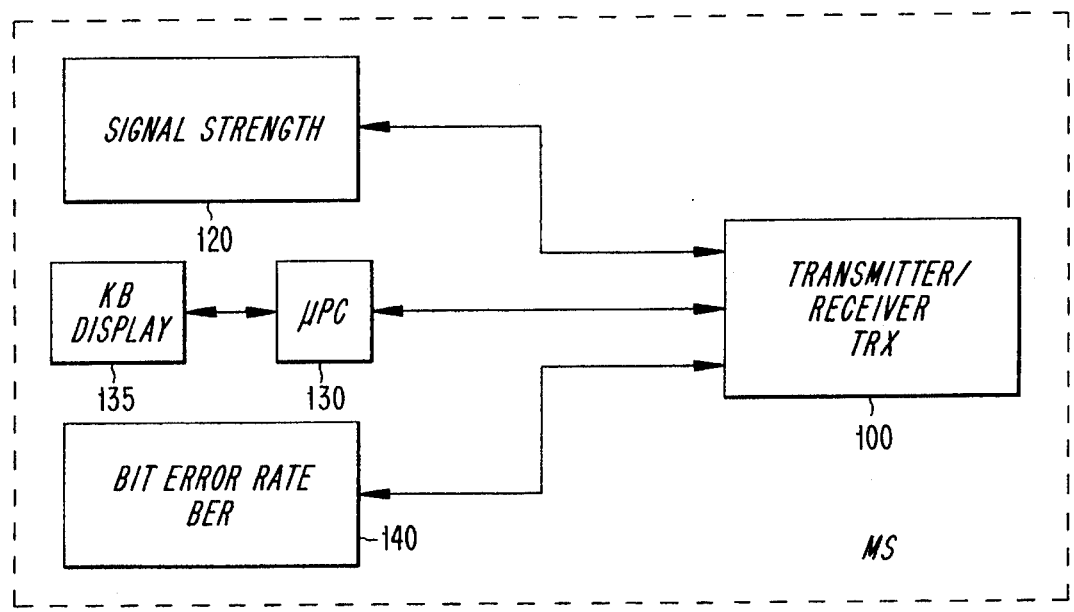
FIG. 3 is a block diagram illustrating a mobile station in a cellular mobile radio system according to FIG. 2.

Referring now to FIG. 3, an embodiment of a mobile station that can be utilized in a cellular telephone system that operates in accordance with the present invention is illustrated. This particular example pertains to a mobile station that can be used in a digital communications system, i.e., one in which digitized voice information is transmitted between base and mobile stations on a full-rate transmission basis. It will be readily appreciated, however, that the invention is equally applicable to other types of cellular radio systems, such as those in which information is transmitted in an analog format or transmitted digitally at a half rate. Only those portions of the mobile station which are used in connection with the present invention are shown. The remainder of the parts of the mobile station may be provided in accordance with known techniques and components.

Incoming radio frequency signals are received by a transmitter/receiver TRX 100. The timing is synchronized to the receiving sequence by the microprocessor controller 130. The strength of the received signals are measured by a signal strength measuring part 120. The received signal strength value is then sent to the microprocessor controller 130.

The bit error measuring part BER 140 analyzes the signal received by the transmitter/receiver TRX 100 and determines the bit error rate BER of the signal. The bit error rate BER is input into the microprocessor µPC 130 for further analysis in accordance with the present invention.

The microprocessor controller 130 controls the mobile station activity and the base station communication, and also handles the terminal keyboard input and display output 135. Decisions by the microprocessor controller 130 are made in accordance with received messages and measurements that are made. The keyboard and display unit 131 enable information to be exchanged between the user and the base station.

A base station that can be utilized in a cellular telephone system that operates in accordance with the present invention incorporates component parts which are substantially identical in construction and function to component parts of the mobile station illustrated in FIG. 3 and described in conjunction therewith. The components of such a base station is within the skill of the ordinary artisan and will not be described in detail herein.

There are, however, some distinctions between the mobile and base stations. For instance, the base station does not include a user keyboard and display unit 135 as utilized in the mobile station. Additionally, there can be a plurality of channels provided in the base station, with a plurality of inputs and outputs. The number of channels used would be dependent upon system requirements as determined by the system designers.

Finally, the base station to be used with the present invention would include additional components used for message communication with the mobile switching center MSC. The nature and function of the components are within the skill of the ordinary artisan and will not be described in detail herein.

Figure 4:
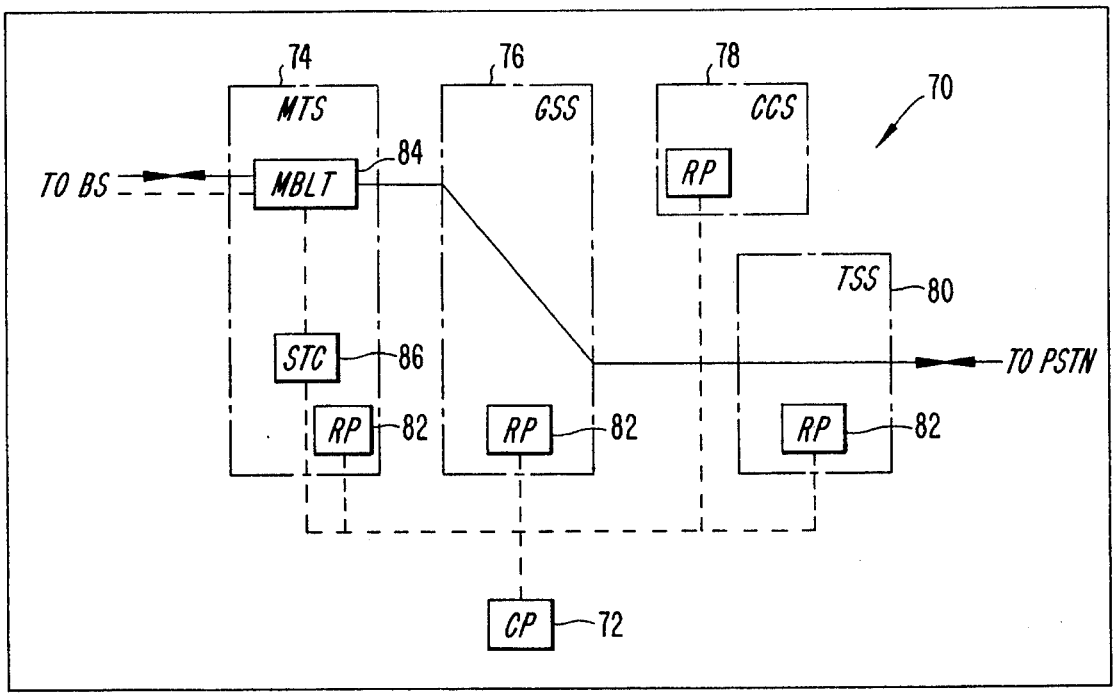
FIG. 4 is a block diagram illustrating a mobile switching center in a cellular mobile radio system according to FIG. 2.

FIG. 4 is a block diagram of an example of a mobile switching center which can be used to implement the method according to the present invention. FIG. 4 shows but one example of a mobile switching center. Other systems may also be used.

The mobile switching center 70 is a highly modular system which includes a central processor 72 and a mobile telephone subsystem 74 for the cellular system which is integrated with the other subsystems. A group switching subsystem 76, a common channel signalling subsystem 78, and a trunk and signalling subsystem 80 are connected to the central processor 72. The mobile telephone subsystem 74 includes a regional processor 82, a mobile telephone base station line terminal 84 and a signalling terminal 86. The remaining subsystems also each include a regional processor 82.

The mobile telephone subsystem 74 handles all specific mobile subscriber functions, cellular network functions, as well as the signalling with the mobile stations. Subsystem 74 also provides the common channel signalling subsystem 78 with the necessary data from the mobile switching center signalling. The operation and maintenance functions specific for the cellular system are also implemented in the mobile telephone subsystem 74. The mobile telephone subsystem 74 includes the mobile telephone base station line terminals 84 which connect the mobile telephone subsystem 74 to the various base stations within the system and to the public switching telephone network. The signalling terminal 86 provided in the mobile telephone subsystem 74 handles data communication between the mobile switching center and the base stations. The regional processor 82 provided in each of the subsystems stores and executes the regional software for the switching system, handling simple, routine and high capacity tasks.

The group switching subsystem 76 is controlled by a traffic control subsystem (not shown). The group switching subsystem 76 sets up, supervises and clears connections through the group switch (not shown). The common channel signalling subsystem 78 contains functions for signalling, routing, supervision and correction of messages sent in accordance with a predetermined standard. The trunk and signalling subsystem 80 supervises the state of the trunk lines to the public switching telephone network and to the other mobile switching centers.

The central processor 72 stores and executes the central processor software for the switching system, handling the more complex functions. These functions include, but are not limited to, job administration, store handling, loading and changing of programs, etc.

The present invention relates to a method and system for performing the measurement evaluation portion of the handoff process, and particularly, for performing the measurement evaluation portion as seldom as possible. The method provides the means to select only the mobile stations which are located in a part of the coverage area of a cell for measurement evaluation. For purposes of this description, this area will be referred to as the evaluation, or first, region. The remaining part of the coverage area of a cell will be referred to as the non-evaluation, or second, region.

According to a preferred embodiment, the method is implemented without letting the mobile stations be in charge of the handoff decision. In this way, the network characteristics related to handoff remain under the control of the land system. The method may be performed in the mobile switching center, base station controller, or any other controlling part of the land system. However, for purposes of simplicity, the description refers only to the mobile switching center or the land system.

The method, according to a preferred embodiment, uses two messages to report measurement values of various signal connection parameters from the mobile station to the network, or mobile switching center, MEASUREMENT VALUES and CONDITION FULFILLED. The MEASUREMENT VALUES message is sent periodically from the mobile station and the CONDITION FULFILLED message is sent from the mobile station whenever at least one of the conditions or rules assigned by a CONDITIONS SET message is satisfied. A CONDITIONS SET message is sent to the mobile station by the mobile switching center to assign one or more of the following reporting conditions or rules regarding the various signal connection parameters for each connection.

1. SSNEIGH>SSOWN+SSTHNEIGH
2. SSMIN>SSOWN
3. BEROWN>BERMAX
4. SSOWN>SSMAX
5. SSNEIGH>SSNEIGHMIN

The parameters SSOWN, SSNEIGH, and BEROWN are measured by the mobile station. The other parameters are defined by the land system as necessary and are sent to the mobile station in the CONDITIONS SET message. These three messages are described herein in general terms only. In different telecommunications standards around the world (e.g., GSM, ADC, JDC), some or all of these messages exist. However, none of these standards include the possibility of setting the large number of conditions or rules provided by the present invention. The values of the parameters depend on the cell structure, network structure, and the desired behavior, according to techniques which are within the skill of the ordinary artisan.

The reporting conditions may be changed by the mobile switching center at any time, either automatically or by operator intervention. At the border between the evaluation region and the non-evaluation region of a cell according to the present invention, a change is initiated by the land system. This change is done as a response to the CONDITION FULFILLED message from the mobile station, when the mobile station enters the evaluation region, or when the land system detects that the mobile station has left the evaluation region (and thus has entered the non-evaluation region). According to a preferred embodiment, when at least one of the reporting conditions which have been assigned for the connection is satisfied, the mobile station has entered, by definition, the evaluation region.

The parameter SSOWN represents the signal strength value of the current connection between the mobile station and the base station currently handling the call. The SSNEIGH parameter represents the signal strength value of a neighboring base station. The SSTHNEIGH parameter represents the signal strength threshold to a neighboring base station, or cell. This threshold is set for each neighboring cell by the CONDITIONS SET message and can be both a positive and a negative value. Using both positive and negative values provides the possibility of defining the border between the evaluation region and the non-evaluation region of the cell in a flexible manner. SSTHNEIGH is used to define the signal strength threshold towards a neighboring cell; when the signal strength of the neighboring base station is greater than the signal strength of the current connection plus the threshold, the mobile station is said to have entered the evaluation region.

Figure 5A:
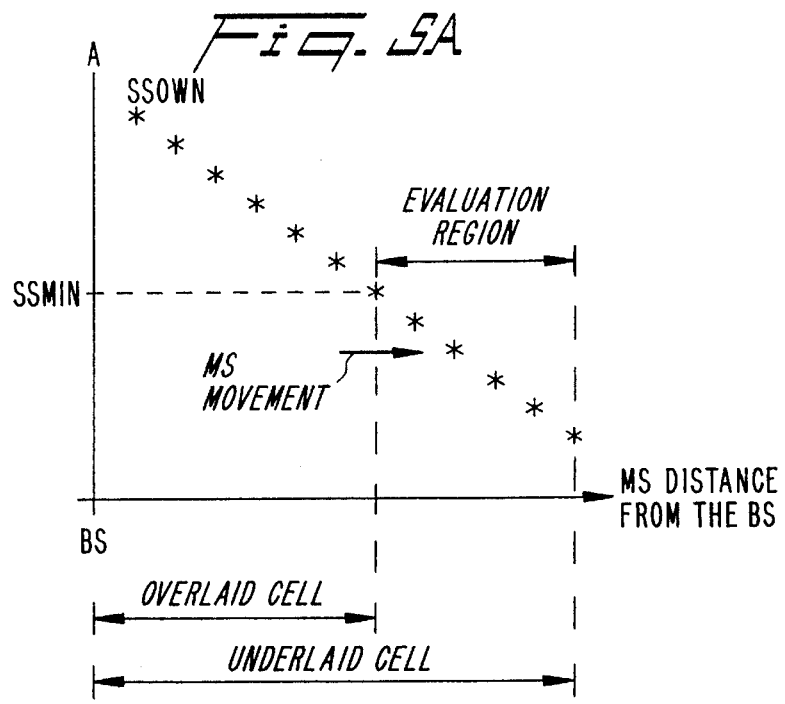
FIG. 5A is an illustration showing the designation of an evaluation region in the case of overlaid/underlaid cells for a mobile station connected to the overlaid cell.

The parameter SSMIN represents the minimum signal strength value of the current connection. This parameter is set for each connection. SSMIN defines the lowest allowed reception level for the current connection that the mobile station will accept without reporting measurement values to the mobile switching center. This parameter can be used in small cells lying within umbrella cells and as a method of discovering that mobile station is on its way into a region without any coverage at all. This limit can also be used to define the border between an overlaid and the region of an underlaid cell which is not covered by its overlaid cell. FIG. 5A illustrates the movement of the mobile station towards the evaluation region of an overlaid cell. When the signal strength of the current connection SSOWN (measured by the mobile station) goes below the minimum signal strength SSMIN, the mobile station has (by definition) entered the evaluation region. The mobile station reports this (to the land system) by the message CONDITION FULFILLED. In this case, the evaluation region is more or less the same as the region of an underlaid cell which is not covered by its overlaid cell.

If the mobile station moves towards an uncovered area it will (sooner or later) satisfy rule 2: SSOWN=<SSMIN. If the condition is set for the mobile station, the fulfillment of rule 2 will be reported to the land system (in the CONDITION FULFILLED message). At this stage, the evaluation process will start.

The BER parameter represents the bit error rate of the current connection and BERMAX represents the maximum allowed bit error rate of the current connection. BERMAX is set for each connection and defines when the mobile station enters the evaluation region based on the reception quality. That is, when more than the maximum allowed number of errors occur, the mobile station is presumed to have entered the evaluation region.

Figure 5B:
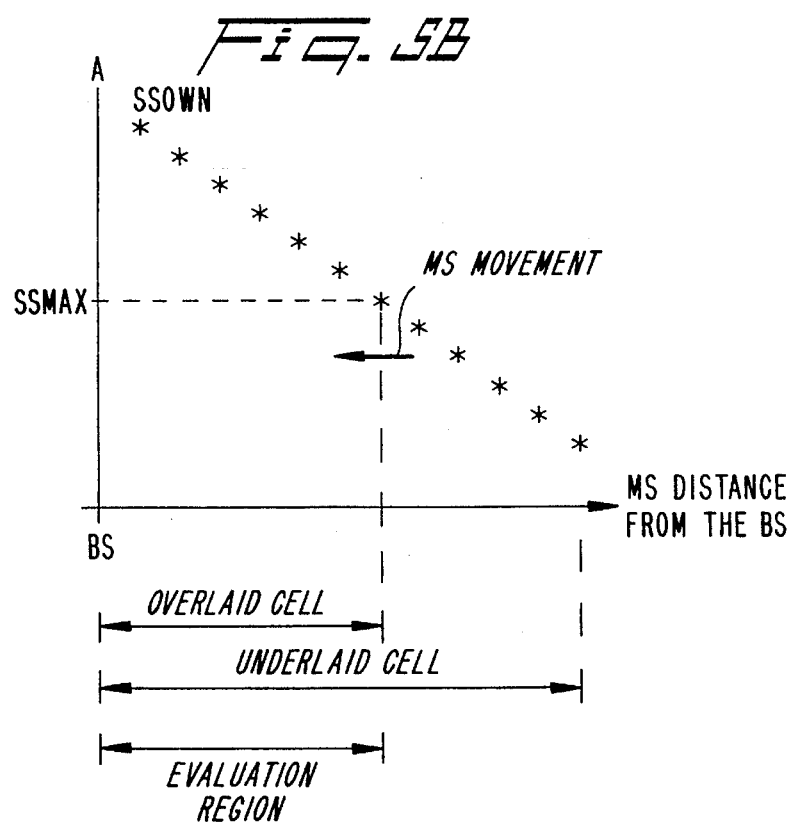
FIG. 5B illustrates the evaluation region for the case of a mobile station connected to the underlaid cell.

SSMAX represents the maximum signal strength value of the current connection, set for each connection. SSMAX defines the highest allowed reception value for the current connection that the mobile station will accept without reporting measurement values to the mobile switching center. When passing this value, the mobile station enters the evaluation region. This limit can be used to define the border between the region of an underlaid cell, which is not covered by its overlaid cell, and its overlaid cell. FIG. 5B illustrates the movement of the mobile station towards the evaluation region of an underlaid cell. When the signal strength of the current connection SSOWN (measured by the mobile station) goes above the maximum signal strength SSMAX, the mobile station has (by definition) entered the evaluation region. The mobile station reports this (to the land system) by sending the message CONDITIONS FULFILLED. In this case, the evaluation region is more or less the same as the region of an underlaid cell which is covered by its overlaid cell."

The parameter SSNEIGHMIN represents the minimum reception value of a neighboring cell. This value is set for each cell. SSNEIGHMIN is the lowest reception level that the mobile station can accept for a certain neighboring cell. When passing this level, the mobile station enters the evaluation region. This parameter can be use to detect when the mobile station is getting close to a small cell lying within, for instance, an umbrella cell.

FIG. 6 illustrates this process. The "+" represents SSNEIGH of base station BS2 for a mobile station in a cell served by base station BS1. When the SSNEIGH (measured by the mobile station) goes above SSNEIGHMIN, the mobile station has (by definition) entered the evaluation region of the cell served by BS1. The mobile station reports this (to the land system) by the message CONDITION FULFILLED. The land system can now evaluate whether the mobile station shall be connected to the small cell or not.

According to one embodiment of the present invention, it is possible to switch on and off the messages reporting measurement values. This is done by the mobile switching center which sends a message ordering the mobile station either to switch on or off the reporting messages. FIG. 7 illustrates the handoff process according to this alternative embodiment. Initially, according to this embodiment, MEASUREMENT VALUES is switched off and CONDITION FULFILLED is switched on. As long as no CONDITION FULFILLED message is received by the mobile switching center, no measurement evaluation is performed (NIL, 16). When a CONDITION FULFILLED message is received (18), the measurement evaluation is started (10). Then, MEASUREMENT VALUES is switched on and CONDITION FULFILLED is switched off. The measurement values from the MEASUREMENT VALUES message (and the initial CONDITION FULFILLED message) are used to decide whether or not to perform a handoff (12, 14). If none of the conditions assigned by the CONDITIONS SET message is true (20), the mobile switching center switches back to the initial conditions, i.e., MEASUREMENT VALUES is switched off and CONDITION FULFILLED is switched on, since the fact that the condition that triggered (18) no longer exists means that the mobile station MS has, by definition, left the evaluation region. The land system then switches back to the NIL state (16) and sends a CONDITIONS SET message (20) to the mobile station MS.

Figure 8:
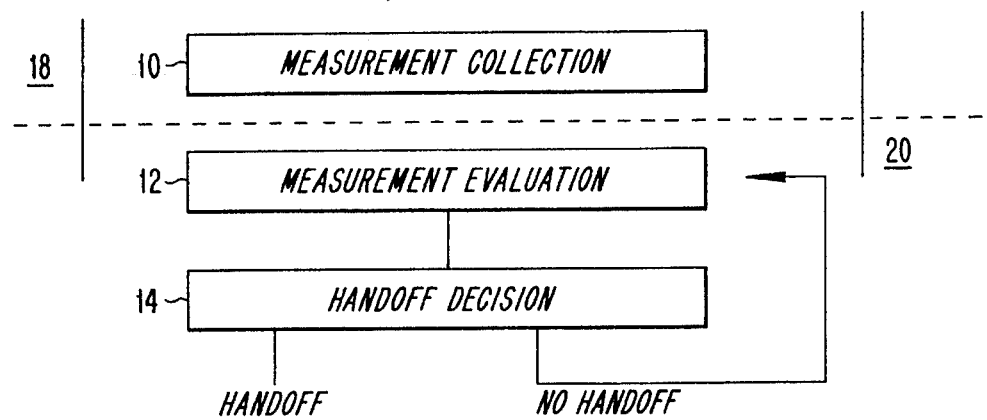
FIG. 8 illustrates the handoff process from the side of the cellular communications network according to another embodiment of the present invention.

An alternative embodiment in which the reporting messages are not switched on and off is illustrated in FIG. 8. In this case, no message evaluation will be performed until the CONDITION FULFILLED message is received. That is, measurement collection (10) by the mobile switching center continues until the CONDITION FULFILLED message is received (18). Then measurement evaluation (12) begins and the handoff decision is made (14).

Figure 9:
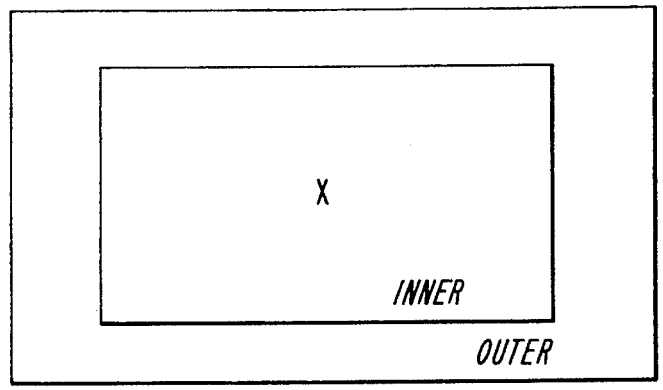
FIG. 9 illustrates the division of a cell in a cellular telecommunications network into an outer and an inner region according to the present invention.

One application for the method according to the present invention is in Japan. According to the Japanese standard, ("Digital Cellular Telecommunication System, RCR Standard", RCR STD-27B, Research & Development Center for Radio Systems, December, 1992), the mobile station MS is allowed to report measurement values periodically (message: CONDITION REPORT 1). It also allows the mobile station MS to send the same information as is sent periodically in the message CONDITION REPORT 1) by a separate message (CONDITION REPORT 2) whenever a neighboring cell is "A" db better than the own cell. "A" is in the range (−127 . . . 0 . . . 127 dB). The condition (rules) is set by either of the messages CONDITION REPORT INFORMATION or CONDITION REPORT STATE. Further, the mobile station can only report when the measurement value of a neighboring cell is better than that of its own cell (as described in Appendix C of RCR STD-27B). This means that the normal division of a cell according to the Japanese standard is in two regions: an inner region and an outer region as shown in FIG. 9. This division is equivalent to rule 1 discussed above. The outer region then constitutes the evaluation region.

In the Japanese standard RCR STD-27B, the mobile sends measurement values of the neighboring cells to the mobile switching center periodically. This is done by the message CONDITION REPORT 1. The mobile station can also be requested to report to the mobile switching center if a certain condition is satisfied. This is reported by the message CONDITION REPORT 2. The message CONDITION REPORT 2 is sent as soon as there is a frequency (which is subject to measurements) of a neighboring cell that is received a predetermined number of decibels (dB) stronger than the current connection. The predetermined number of decibels, A dB, is set by the mobile switching center using either of the messages CONDITION REPORT INFORMATION or CONDITION REPORT STATE.

Initially, that is, at call set-up and after every successful handoff, the several reporting conditions are set by the CONDITION REPORT INFORMATION message. A condition T2 is set indicating the transmission periodicity of the CONDITION REPORT 1 message. This value ranges from 1–225 seconds. The value of the signal strength threshold A to a neighboring cell before a CONDITION REPORT 2 message is to be sent is set, in a range of −127 to 127 dB. Finally, the frequencies for which the reception level is to be measured are indicated. Between 0 and 20 frequencies may be measured.

Whenever a reporting condition is to be changed, a CONDITION REPORT STATE message can be sent. This message would not change the indication of the frequencies on which measurements are to be performed. If the frequencies on which measurements are to be performed are to be changed, a CONDITION REPORT INFORMATION message is sent. Reference is made to the RCR STD-27B, "RT Management" chapter and the appendix C to the "Layer 3 Standards" chapter for further explanation of these messages.

Since the mobile station does not send a CONDITION REPORT 2 message if the bit error rate (BER) decreases, the mobile switching center has to supervise the BER of the uplink (mobile station to base station) and downlink (base station to mobile station) connections, as well as the received signal strength. If the BER increases to an unacceptable level, or if the received signal strength decreases to an unacceptable level, the mobile switching center requests that the mobile station sends a CONDITION REPORT 1 message periodically, for example, every second.

A "normal" cell is a cell which only has neighboring cells outside its coverage area. According to one embodiment of the present invention, application of the method to the Japanese standard will yield the following scenario for a "normal" cell. Initially, that is, at call set up and after every successful handoff, two conditions are set by the CONDITION REPORT INFORMATION message. The first condition is that T2 is set to, e.g., 255 seconds, so that measurement values are reported as seldom as possible. Second, the predetermined number A is set such that it is less than the lowest desired threshold to a neighboring cell. This results in the definition of an evaluation region close to the cell border where this condition is satisfied.

Because the CONDITION REPORT 1 message cannot be switched off completely (it appears every 255 seconds) the message has to be ignored as long as the mobile station is not in the evaluation region. The measurement values are thus collected but not evaluated (FIG. 8). As soon as there is a CONDITION REPORT 2 message received, the message is acknowledged. The mobile station is now in the evaluation region. The reporting conditions are changed by the sending of a CONDITION REPORT STATE message to the mobile station as follows. T2 is set, for example, to "1 " second, to increase to a relatively frequent occurrence, the reporting of measurement values. A is set to 127 dB, which condition is normally never satisfied.

If the evaluation and the subsequent decision leads to handoff, the reporting conditions are set to whatever is desired for the new cell alter handoff into the cell. If the mobile station MS is in the evaluation region of the new cell the conditions are set such that the mobile station MS reports measurement values every second. On the other hand, if the mobile station MS is in the "inner" region of the new cell, no evaluation is needed and the reporting conditions are set accordingly (CONDITION REPORT 1 every 255 seconds and CONDITION REPORT 2 whenever the condition is fulfilled). However, the land system may use either of the messages CONDITION REPORT INFORMATION or CONDITION REPORT STATE according to the Japanese standard.

Figure 10:
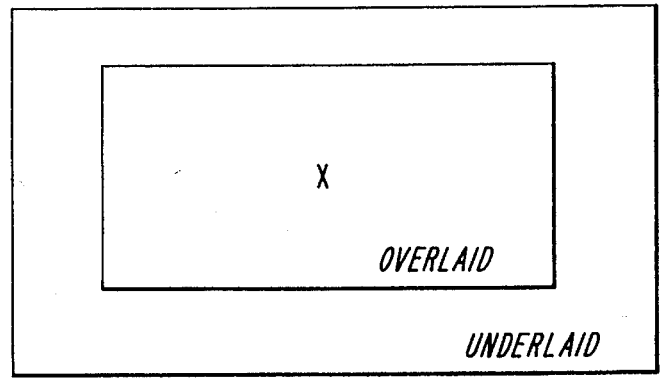
FIG. 10 illustrates a typical configuration of an overlaid and an underlaid cell within a telecommunications network.

An application of an embodiment of the present invention to overlaid and underlaid cells will now be described. Overlaid and underlaid cells are cells which use the same site for transmission but use different transmission power levels. This is schematically represented in FIG. 10, where X is the center of both the underlaid and overlaid cells. The overlaid cell uses a lower power level than the underlaid Cell. Thus, the underlaid cell covers a larger area. A mobile station which is positioned in the coverage area of both the overlaid and the underlaid cell is generally preferably connected to the overlaid cell. According to an embodiment of the present invention, when the method is applied to the Japanese standard, the following scenario for overlaid and underlaid cells results.

The conditions must be set such that the border line where the condition for the CONDITION REPORT 2 message is satisfied coincides with the border between the overlaid and the region of the underlaid cell which is not covered by its overlaid cell. This means that the evaluation region is the region covered only by the area of the underlaid cell which is not covered by the overlaid cell.

Figure 11:
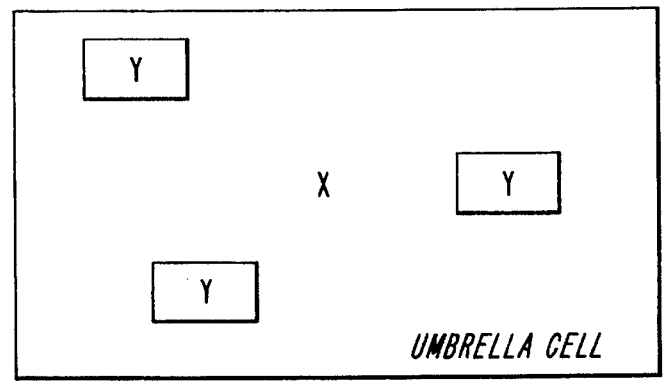
FIG. 11 illustrates a typical configuration of an umbrella cell and microcells therein within a telecommunications network.

In cases of umbrella cells, that is, a large cell which covers an area where there are small cells that cover small areas within the large cell coverage area, the application of an embodiment of the method according to the present invention to the Japanese standard yields the following scenario. An umbrella cell is schematically illustrated in FIG. 11, where X is the center of the umbrella cell and Y are the centers of the small cells. The reporting conditions within the umbrella cell have to be set either such that the small cells are in the evaluation region of the cell or such that the complete cell is the evaluation region. When A is set to 255 dB and T2 defines a reasonable periodicity, e.g., 1 second, both the umbrella cell and the small interior cells constitute the evaluation region.

FIGS. 12 and 13 illustrate flow charts of two embodiments of the method according to the present invention. Identical steps in the two flow charts are labelled using the same reference numerals. The flow of control through the mobile station and the land system is shown on the left and right sides of the flow chart, respectively.

In the embodiment shown in FIG. 12, in step 200, the reporting conditions, or rules are, defined in the land system which delimit the evaluation region and these rules are sent to the mobile station in the CONDITIONS SET message, at step 210. The rules are redefined at the beginning of each connection, after each handoff, when the mobile station MS moves from the non-evaluation region into the evaluation region, and when the mobile station MS moves from the evaluation region into the non-evaluation of a cell. In the embodiment shown in FIG. 13, the measurement values necessary for the handoff decision are sent continuously from the mobile station to the land system (step 300). In a preferred embodiment step 300 should be repeated periodically regardless of the other steps.

A first of the rules requires that a mobile station is determined to have entered the first region when a signal strength value of a neighboring cell is greater than or equal to the sum of a signal strength value of the mobile station connection and a signal strength threshold towards a neighboring cell, wherein the signal strength threshold is set for each neighboring cell. A second of the rules requires that a mobile station is determined to have entered the first region when a minimum signal strength value of the current connection is greater than or equal to a signal strength value of the mobile station connection, wherein the minimum signal strength value is set for each connection, and wherein a third rule requires that a mobile station is determined to have entered the first region when a bit error rate of the current connection is greater than or equal to a maximum allowed bit error rate, wherein the maximum allowed bit error rate is set for each connection. A fourth rule requires that a mobile station is determined to have entered the first region when a signal strength value of the mobile station connection is greater than or equal to a maximum signal strength value for the mobile station connection, wherein the maximum signal strength value is set for each connection. A fifth rule requires that a mobile station is determined to have entered the first region when a signal strength level of a neighboring cell is greater than or equal to a minimum reception level of the neighboring cell, wherein the minimum reception level is set for each neighboring cell.

In step 220, the mobile station receives the rules and determines, on a continuous basis, whether any of the rules are satisfied (step 230). When one of the rules is satisfied, the first message is sent to the land system (step 240). This message is received in the land system (step 250). The land system then sends new rules to the mobile station at step 255, including e.g., an order requiring reporting measurement values continuously (or periodically). The mobile station MS then acts in accordance with those new rules, i.e., reports measurement values continuously (step 300).

In the embodiment of FIG. 12, the collection and evaluation of the measurements necessary for the handoff decision begins in the land system after the message is received from the mobile station (step 260). In the embodiment of FIG. 13, only the evaluation of the measurement values begins after the message is received from the mobile station (step 310), since the collection of the values has been ongoing. In both embodiments, the handoff decision is reached at step 270.

While the above description discusses the Japanese digital standard, it is understood that the method and apparatus according to the present invention may also be implemented using other standards, such as U.S. or European.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method of controlling handoff in a telecommunications network, the network including a land system and a plurality of mobile stations, the land system including a plurality of cells, the method comprising the steps of:

measuring continuously, by each of the mobile stations, during a call and independent Of the range from the land system, the signal quality of specified channels;

reporting, by the mobile stations, the results of said step of measuring to the land system;

dividing each cell into a first region where evaluation of measurement values is performed by the land system and a second region where the evaluation of measurement values is not performed by the land system;

performing an evaluation of the measurement values when a mobile station enters the first region; and controlling the handoff in the land system based on the evaluation of the measurement values.

2. The method according to claim 1, further comprising the steps of:

sending a first message from the mobile station to the land system when a mobile station enters the first region; and beginning the step of performing the evaluation of the measurement values responsive to the land system receiving the first message.

3. The method according to claim 2, further comprising the step of:

performing collection of the measurement values from the mobile station before the step of performing an evaluation of the measurement values when the mobile station enters the first region.

4. The method according to claim 3, further comprising the steps of:

sending a second message from the mobile station to the land system when the mobile station leaves the first region; and stopping the evaluation of the measurement values responsive to the second message.

5. The method according to claim 4, further comprising the step of stopping the sending of the measurement values from the mobile station after the second message is sent from the mobile station.

6. The method according to claim 1, wherein the step of dividing each cell into the first and second regions is performed in the land system and comprises the steps of:

defining rules delimiting the first region for each cell in the land system; and sending the rules to the mobile stations in the network.

7. The method according to claim 6, wherein a first rule of said rules requires that a mobile station is determined to have entered the first region when a signal strength value of a neighboring cell is greater than or equal to the sum of a signal strength value of a current connection between the mobile station and the cell currently handling the call a signal strength threshold towards the neighboring cell, wherein the signal strength threshold is set for each neighboring cell.

8. The method according to claim 6, wherein a second rule of said rules requires that a mobile station is determined to have entered the first region when a minimum signal strength value of the current connection is greater than or equal to a signal strength value of the mobile station connection, wherein the minimum signal strength value is set for each connection.

9. The method according to claim 6, wherein a third rule of said rules requires that a mobile station is determined to have entered the first region when a bit error rate of the current connection is greater than or equal to a maximum allowed bit error rate, wherein the maximum allowed bit error rate is set for each connection.

10. The method according to claim 6, wherein a fourth rule of said rules requires that a mobile station is determined to have entered the first region when a signal strength value of the mobile station connection is greater than or equal to a maximum signal strength value for the mobile station connection, wherein the maximum signal strength value is set for each connection.

11. The method according to claim 6, wherein a fifth rule of said rules requires that a mobile station is determined to have entered the first region when a signal strength level of a neighboring cell is greater than or equal to a minimum reception level of the neighboring cell, wherein the minimum reception level is set for each neighboring cell.

12. The method according to claim 6, further comprising the step of:

in the mobile station, reporting measurement values continuously to the land system, and sending a first message from the mobile station to the land system reporting that it has entered the first region of the cell when one of the rules defined for the cell is satisfied, which message triggers the performance of the evaluation of the measurement values in the land system.

13. The method according to claim 12, wherein the land system orders the mobile station to perform reporting of the measurement values continuously.

14. The method according to claim 6, wherein when one of said rules defined for the cell is satisfied, the mobile station sends a first message to the land system reporting that it has entered the first region of the cell, which message triggers the performance of the evaluation of the measurement values in the land system, the performance being delayed to allow sufficient time to receive enough measurement values from the mobile station to make a handoff decision, wherein after the first message is sent, the land system sends an order to the mobile station to report measurement values continuously.

15. The method according to claim 14, wherein the land system orders the mobile station not to report the measurement values continuously until after the mobile station enters the first region.

16. A method of controlling handoff in a cellular network, the network including a land system and a plurality of mobile stations, the land system including at least one cell, the method comprising:

defining a plurality of rules in the land system and sending the plurality of rules to the plurality of mobile stations;

continuously determining, in a mobile station, if at least one of the rules is satisfied;

sending a first message from the mobile station to the land system responsive to the at least one of the rules being satisfied; and performing evaluation of measurement values by the land system responsive to receiving the first message.

17. The method according to claim 16, further comprising making a handoff decision responsive to the evaluation of the measurement values in the land system.

18. The method according to claim 16, wherein a first rule of the plurality of rules is satisfied when a signal strength value of a neighboring cell is greater than or equal to the sum of a signal strength value of a current connection between the mobile station and the cell currently handling the call and a signal strength threshold towards a neighboring cell, wherein the signal strength threshold is set for each neighboring cell.

19. The method according to claim 16, wherein a second rule of the plurality of rules is satisfied when a minimum signal strength value of the current connection is greater than or equal to a signal strength value of the mobile station connection, wherein the minimum signal strength value is set for each connection.

20. The method according to claim 16, wherein a third rule of the plurality of rules is satisfied when a bit error rate of the current connection is greater than or equal to a maximum allowed bit error rate, wherein the maximum allowed bit error rate is set for each connection.

21. The method according to claim 16, wherein a fourth rule of the plurality of rules is satisfied when a signal strength value of the mobile station connection is greater than or equal to a maximum signal strength value for the mobile station connection, wherein the maximum signal strength value is set for each connection.

22. The method according to claim 16, wherein a fifth rule of the plurality of rules is satisfied when a signal strength level of a neighboring cell is greater than or equal to a minimum reception level of the neighboring cell, wherein the minimum reception level is set for each neighboring cell.

23. The method according to claim 16, further comprising the step of, in the mobile station, reporting measurement values continuously to the land system, wherein when one of the rules defined for the cell is satisfied, the mobile station sends a first message to the land system reporting that the at least one of the rules is satisfied, which message triggers the performance of the evaluation of the measurement values in the land system.

24. The method according to claim 16, wherein when one of the rules defined for it cell is satisfied, the mobile station sends a first message to the land system reporting that the at least one of the rules is satisfied, which message triggers the performance of the evaluation of the measurement values in the land system, the performance being delayed to allow sufficient time to receive enough measurement values from the mobile station to make a handoff decision, wherein after the first message is sent, the land system sends an order to the mobile station to report the measurement values continuously.

25. The method according to claim 16, wherein the land system orders the mobile station to perform reporting of the measurement values continuously.

26. The method according to claim 16, wherein the land system orders the mobile station not to report the measurement values continuously until after at least one of the rules is satisfied.

27. A cellular mobile radio telephone system including a land system and a plurality of mobile stations, the land system including a plurality of base stations covering corresponding geographical areas in the system, the system comprising:

means, provided in each of the mobile stations, for continuously monitoring signal connection parameters between the mobile stations and the land system;

means for dividing the area covered by each base station into an evaluation region and a non-evaluation region;

means, provided in the land system, for performing evaluation of signal connection parameters when a mobile station enters the evaluation region responsive to receiving a message from the mobile station; and means provided in the land system for controlling handoff of a call handled by one of the base stations for a neighboring base station based on the evaluation of the signal connection parameters.

28. The system according to claim 27, wherein the plurality of mobile stations further comprise:

means for reporting the monitored signal connection parameters to the land system.

29. The system according to claim 28, wherein the means for dividing the area covered by each cell into the evaluation and non-evaluation regions comprises:

means for determining a plurality of changeable rules delimiting the evaluation region for each base station;

means for sending the plurality of changeable rules to the mobile stations in the network; and the mobile stations comprise:

means for evaluating whether at least one of the plurality of rules is satisfied; and means for reporting to the land system entry into the evaluation region of the area covered by the base station currently handling the communication.

30. The system according to claim 29, wherein the land system further comprises means for collecting the reported signal connection parameters.

31. The system according to claim 29, wherein the signal connection parameters include at least one of signal strength and signal bit error rate.

32. The system according to claim 31, wherein a first rule of the plurality of changeable rules requires that a mobile station report that it has entered the evaluation region when a signal strength value of a neighboring base station is greater than or equal to the sum of a signal strength value of a current connection between the mobile station and the base station currently handling the Call and a signal strength threshold towards a neighboring base station, wherein the signal strength threshold is set for each neighboring base station.

33. The system according to claim 31, wherein a second rule of the plurality of changeable rules requires that a mobile station report that it has entered the evaluation region when a minimum signal strength value of the current connection is greater than or equal to a signal strength value of the mobile station connection, wherein the minimum signal strength value is set for each connection.

34. The system according to claim 31, wherein a third rule of the plurality of changeable rules requires that a mobile station report that it has entered the evaluation region when a bit error rate of the current connection is greater than or equal to a maximum allowed bit error rate, wherein the maximum allowed bit error rate is set for each connection.

35. The system according to claim 31, wherein a fourth rule of the plurality of changeable rules requires that a mobile station report that it has entered the evaluation region when a signal strength value of the mobile station connection is greater than or equal to a maximum signal strength value for the mobile station connection, wherein the maximum signal strength value is set for each connection.

36. The system according to claim 31, wherein a fifth rule of the plurality of changeable rules requires that a mobile station report that it has entered the evaluation region when a signal strength level of a neighboring base station is greater than or equal to a minimum reception level of the neighboring base station, wherein the minimum reception level is set for each neighboring base station.

37. The system according to claim 31, wherein the means for reporting the signal connection parameters operates continuously, responsive to an order from the land system, to report the signal connection parameters continuously to the land system, wherein when one of the plurality of changeable rules defined for the base station is satisfied, the means for reporting that the mobile station has entered the evaluation region sends a first message to the land system reporting that it has entered the evaluation region of the base station, which message triggers operation of the means for performing the evaluation of the signal connection parameters in the land system.

38. The system according to claim 31, wherein when one of the plurality of changeable rules defined for the base station is satisfied, the means for reporting that the mobile station has entered the evaluation region sends a first message to the land system reporting that it has entered the evaluation region of the cell, which message triggers operation of the means for performing the evaluation of the measurement values in the land system, the performance being delayed to allow sufficient time to receive enough measurement values from the mobile station to make a handoff decision, wherein the land system further comprises means, responsive to the sending of the first message, to send an order from the land system to the mobile station to report measurement values continuously.

39. A cellular mobile radio telephone system comprising:
   a plurality of base stations assigned to cover corresponding geographical areas in the cellular system;
   a plurality of mobile stations including:
      means for continuously monitoring signal connection parameters between the mobile stations and the base stations; and
   a land system for coordinating communications between the plurality of mobile stations and the plurality of base stations including:
      means for dividing the area covered by each base station into a first region where evaluation of the signal connection parameters is performed and a second region where the evaluation of signal connection parameters is not performed;
      means for performing the evaluation of signal connection parameters when a mobile station enters the first region responsive to a message received from the mobile station; and
      means for controlling handoff of a call handled by one of the base stations for a neighboring base station based on the evaluation of the signal connection parameters.

40. The system according to claim 39, wherein the plurality of mobile stations further comprise:
   means for reporting the monitored signal connection parameters to the land system.

41. The system according to claim 39, wherein
   the means for dividing the area covered by each cell into the first and second regions comprises:
      means for determining a plurality of changeable rules delimiting the first region for each base station;
      means for sending the plurality of changeable rules to the mobile stations in the network; and
   the mobile stations comprise:
      means for evaluating whether at least one of the plurality of changeable rules is satisfied; and
      means for reporting to the land system that the mobile has entered the first region of the area covered by the base station currently handling the communication.

42. The system according to claim 41, wherein a first rule of the plurality of changeable rules requires that a mobile station report that it has entered the first region when a signal strength value of a neighboring base station is greater than or equal to the sum of a signal strength value of it current connection between the mobile station and the base station currently handling the call and a signal strength threshold towards the neighboring base station, wherein the signal strength threshold is set for each neighboring base station.

43. The system according to claim 41, wherein a second rule of the plurality of changeable rules requires that a mobile station report that it has entered the first region when a minimum signal strength value of the current connection is greater than or equal to a signal strength value of the mobile station connection, wherein the minimum signal strength value is set for each connection.

44. The system according to claim 41, wherein a third rule of the plurality of changeable rules requires that a mobile station report that it has entered the first region when a bit error rate of the current connection is greater than or equal to a maximum allowed bit error rate, wherein the maximum allowed bit error rate is set for each connection.

45. The system according to claim 41, wherein a fourth rule of the plurality of changeable rules requires that a mobile station report that it has entered the first region when a signal strength value of the mobile station connection is greater than or equal to a maximum signal strength value for the mobile station connection, wherein the maximum signal strength value is set for each connection.

46. The system according to claim 41, wherein a fifth rule of the plurality of changeable rules requires that a mobile station report that it has entered the first region when a signal strength level of a neighboring base station is greater than or equal to a minimum reception level of the neighboring base station, wherein the minimum reception level is set for each neighboring base station.

47. The system according to claim 41, wherein the means for reporting the signal connection parameters operates continuously, responsive to an order from the land system, to report the signal connection parameters continuously to the land system, wherein when one of the plurality of changeable rules defined for the base station is satisfied, the means for reporting that the mobile station has entered the first region sends a first message to the land system reporting that it has entered the first region of the base station, which message triggers operation of the means for performing the evaluation of the signal connection values in the land system.

48. The system according to claim 41, wherein when one of the plurality of changeable rules defined for the base station is satisfied, the means for reporting that the mobile station has entered the first region sends a first message to the land system reporting that it has entered the first region of the cell, which message triggers operation of the means for performing the evaluation of the measurement values in the land system, the performance being delayed to allow sufficient time to receive enough measurement values from the mobile station to make a handoff decision, wherein the land system further comprises means, responsive to the sending of the first message, to send an order from the land system to the mobile station to report measurement values continuously.

49. The system according to claim 39, wherein the land system further comprises means for collecting the reported signal connection parameters.

50. The system according to claim 39, wherein the signal connection parameters include at least one of signal strength and signal bit error rate.

* * * * *